July 31, 1962 C. T. MURRELL 3,047,088

FOOT REST FOR VEHICLE DRIVERS

Filed Jan. 13, 1961

Carl T. Murrell
INVENTOR.

3,047,088
Patented July 31, 1962

1

**3,047,088
FOOT REST FOR VEHICLE DRIVERS**
Carl T. Murrell, 44 SW. Ave. B, Hamlin, Tex.
Filed Jan. 13, 1961, Ser. No. 82,606
2 Claims. (Cl. 180—90.6)

This invention relates to a novel and useful foot rest for vehicle drivers, and more particularly to a foot rest specifically adapted to be mounted in a vehicle in a manner whereby the driver of a vehicle may rest the foot not normally positioned on the accelerator pedal at substantially the same level and inclination of his foot which is engaged with the accelerator pedal whereby his legs and feet may be comfortably positioned.

The foot rest of the instant invention may be utilized to support the left foot of a vehicle driver at a height above and disposed at an angle relative to the conventional inclined portion of a vehicle floor board substantially equal to the height or inclination of his right foot when engaged with the accelerator pedal of the vehicle.

An object of very great importance of the invention is to provide a device which will permit proper posture of the body of the driver, enable posture control at all times with the use of the left foot, give complete freedom of the right foot for the functional use of accelerating and braking the speed of the car and to serve as a needed safety requirement.

The foot rest of the instant invention comprises an elongated support member having a substantially planar undersurface adapted to closely overlie and rest upon the forwardly and upwardly inclined portion of a vehicle floor board in the driver's area of the vehicle. The lower end of the support member is adapted to be positioned at the intersection of the inclined portion of the floor board and the generally horizontal portion thereof disposed immediately rearwardly of the inclined portion. The elongated support member includes an upper surface complementary to the general contour of the bottom of the shoe. The upper surface includes a forward concave recess adapted to conform to the contour of the lower surface of the sole of the shoe and a rear substantially flat bottomed notch opening upwardly and defined by an upstanding shoulder portion disposed between the recess and the notch which is adapted to conform to the contour of and support the bottom surface of the heel of a shoe.

An elongated panel of flexible material is secured to the bottom surface of the support member and projects beyond opposite ends of the latter and terminates at its rear end in a laterally enlarged portion adapted to overlie the area of the horizontal portion of the floor board adjacent the support member so as to prevent the carpeting covering this portion of the floor board from being scuffed and damaged by the heel of the vehicle driver. The forward end of the flexible member terminates in a tab portion adapted to overlie the area of the fire wall of the vehicle adjacent the upper end of the elongated support member. The tab portion is provided with means adapted for removable securement to the fire wall whereby the foot rest may be removably secured in position in overlying relation to the floor board of the vehicle.

Another object of this invention is to provide a foot rest enabling the left foot of a vehicle driver to be positioned at a height above and at an angle relative to the inclined portion of a vehicle floor board simulating the position in which the driver's other foot is disposed when engaged with the accelerator pedal of the vehicle.

A further object of this invention is to provide a means for removably securing the foot rest in a vehicle whereby the latter may be readily removed when desired.

Still another object of this invention, in accordance with the immediately preceding object, is to provide a foot rest which may be used in the manner intended without actually removably securing the foot rest to the vehicle floor board, the foot rest relying upon only frictional engagement with the floor board and its positioning relative to the inclined and horizontal portions of the floor board for maintaining the desired position.

A final object to be specifically enumerated herein is to provide a device which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
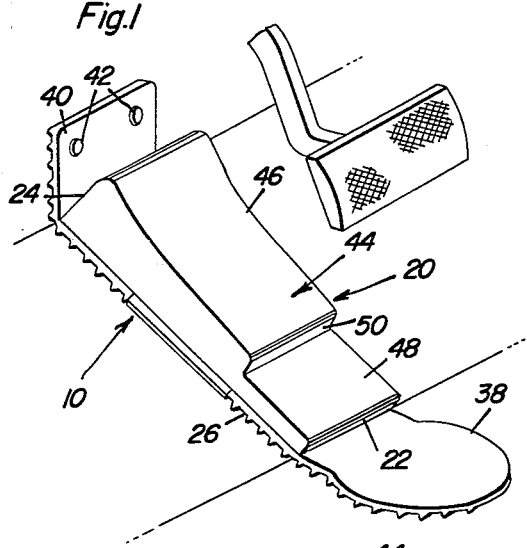
FIGURE 1 is a perspective view of a portion of the floor board of a vehicle with the foot rest of the instant invention shown mounted thereon.

Referring now more specifically to the drawings the numeral 10 generally designates the foot rest of the instant invention. The foot rest is adapted to be used in the driver's compartment of a vehicle of which the floorboard generally referred to by the numeral 12 comprises a part. The floor board 12 includes a rear horizontal portion 14 and an upwardly and forwardly inclined portion 16. The inclined portion 16 terminates at its forward end at the fire wall 18 of the vehicle and the foot rest comprises a generally elongated support member generally referred to by the reference numeral 20 which is positioned in overlying relation to the inclined portion 16 of the floor board 12.

It will be noted that the rear end 22 of the elongated support member is positioned at the intersection of the horizontal portion 14 and the inclined portion 16 of the floor board 12. Although the forward end 24 of the elongated member is illustrated as being positioned at the intersection of the forward end of the inclined portion 16 and the bottom edge of the fire wall 18, it is to be noted that it is not necessary that the elongated support member 20 extend from the horizontal portion 14 to the fire wall 18.

The elongated support member is provided with a generally planar lower surface 26 from which depending ribs 28, 30 and 32 project. The lower surface 26 comprises a panel generally referred to by the reference numeral 34 which is secured to the bottom surface 36 of the elongated support member 20. The panel 34 is formed of flexible material and extends beyond the opposite ends of the support member 20. The rear end of the flexible panel terminates in a laterally enlarged heel portion 38 adapted to overlie the area of the horizontal portion 14 of the floor board 12 immediately adjacent the rear end of the support member. The forward end of the flexible panel 34 is provided with a tab portion 40 which has a pair of snap fastener elements 42 secured therethrough. The snap fastener elements 42 are adapted for removable securement to the fastener elements 44, see FIGURE 2, secured through the fire wall 8. In this manner, the foot rest 10 may be removably secured in overlying relation to portions of the floor board 12 and fire wall 18.

The upper surface of the elongated member is generally referred to by the reference numeral 44 and includes a forward concave recess 46 adapted to conform to the contour of the lower surfaces of the sole of the shoe. The upper surface 44 also includes a rear substantially flat-bottomed notch 48 defined by an upstanding shoulder 50 disposed between the recess 46 and the notch 48. The flat-bottomed notch 48 is adapted to conform to the contour of the bottom surface of the heel of a shoe. Accordingly, the shoe 52, see FIGURE 2, of a driver may be supported by the support member 20 in a manner whereby it is unlikely that normal movement of the driver and vibration of the vehicle will cause the shoe 52 to slide from engagement with the support member 20.

It will be noted that the ribs 28 and 32 extend transversely of the panel 34 and that the ribs 30 extend longitudinally thereof. Accordingly, the ribs 28, 30 and 32 afford a frictional gripping action with the floor board 12 and the fire wall 18 and would also be adapted to afford a frictional gripping action with carpeting disposed over the floor board 12.

Figure 2:
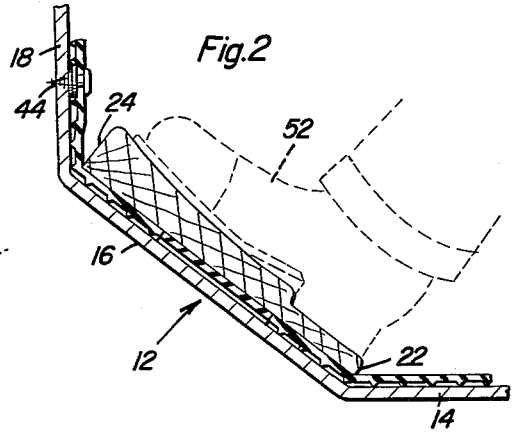
FIGURE 2 is a longitudinal vertical sectional view taken substantially upon the plane passing along the longitudinal center line of the foot rest.
Figure 3:
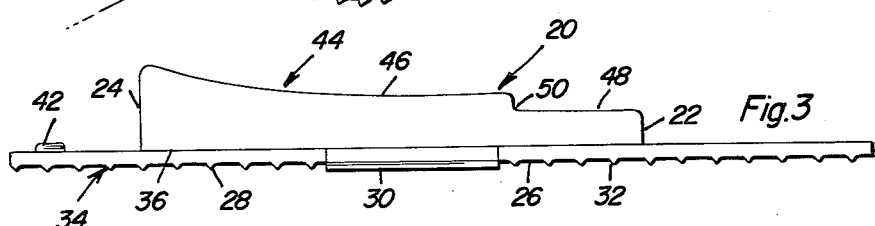
FIGURE 3 is a side elevational view of the foot rest.
Figure 4:
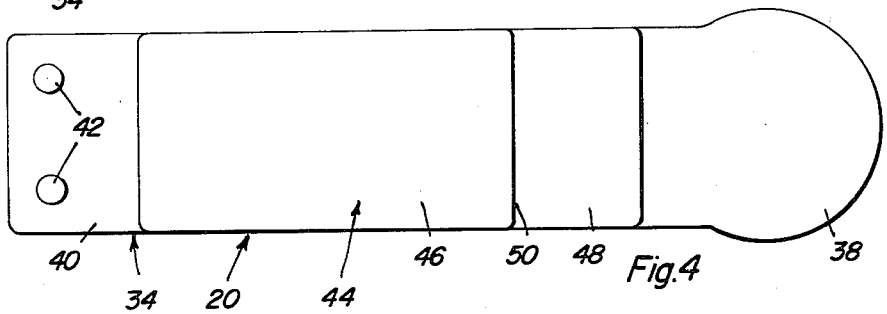
FIGURE 4 is a top plan view of the foot rest.
Figure 5:
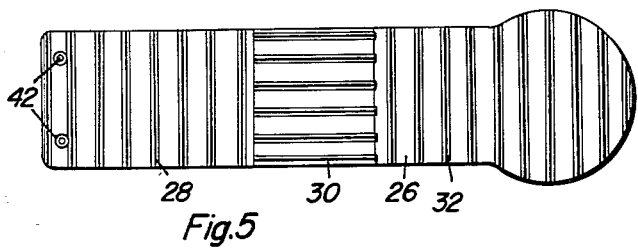
FIGURE 5 is a bottom plan view on somewhat of a reduced scale of the foot rest.

Inasmuch as the rear lower corner of the support member 20 is disposed at the inner section of the horizontal portion 14 and the inclined portion 16 of the floor board 12, rearward sliding movement of the support member is prevented even should the tab portion 40 of the flexible panel 34 not be secured to the fire wall as illustrated in FIGURES 1 and 2. The inclination of the portion 16 of the floor board 12 would naturally prevent forward creeping of the support member 20 and therefore it may be readily appreciated that the snap fastener elements 42 may or may not be utilized at the discretion of the user of the foot rest 10.

The support member 20 may be conveniently constructed of wood or any other suitable inexpensive material such as hard rubber or plastic and the panel 34 may be conveniently constructed of rubber so as to afford a maximum frictional engagement with the floor board 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A foot rest for a vehicle driver adapted to support his foot not normally positioned on the accelerator pedal at substantially the same level and inclination of his foot engaged with the accelerator whereby his legs and feet may be comfortably positioned, said foot rest comprising a demountable elongated support member having a substantially planar under surface adapted to closely overlie and rest upon the forwardly and upwardly inclined portion of a vehicle floor board in the driver's area thereof with the lower end of said support member positioned at the intersection of the inclined portion of the floor board and the generally horizontal portion thereof disposed immediately rearwardly of said inclined portion, said elongated support member including an upper surface complementary to the general contour of the bottom of a shoe and adapted to support the shoe of the driver on his foot not normally positioned on the accelerator of the vehicle, said upper surface being of a height above and disposed at an angle relative to said lower surface so as to be adapted to position said shoe in a manner simulating the manner in which the driver's other shoe engaged with the accelerator is positioned relative to the driver's seat and the various inclined and horizontal portions of said floor board, said lower surface comprising a panel of flexible material secured to the bottom surface of said support member, said panel extending beyond the opposite ends of said support member and terminating at its rear end in a laterally enlarged portion adapted to overlie an area of said horizontal portion of said floorboard adjacent said support member and at its forward end in a tab portion adapted to overlie an area of the fire wall of the vehicle adjacent the upper end of said support member, means adapting said tab portion for readily removable securement to said fire wall, said upper surface including a forward concave recess adapted to conform to the contour of the lower surfaces of the sole of a shoe and a rear substantially flat bottomed notch opening upwardly and defined by an upstanding shoulder portion disposed between said recess and notch, said flat bottomed notch being adapted to conform to the contour of the bottom surface of the heel of a shoe.

2. The combination of claim 1, wherein said lower surface includes downwardly projecting ribs to afford a frictional gripping action with the carpeting disposed on the floor board, some of said ribs extending transversely of said support member and others of said ribs extending longitudinally of said support member.

References Cited in the file of this patent

UNITED STATES PATENTS

| | | |
|---|---|---|
| 1,951,284 | Kramer | Mar. 13, 1934 |
| 2,136,980 | Pim | Nov. 15, 1938 |
| 2,283,600 | Dodson | May 19, 1942 |
| 2,341,081 | Burkholder | Feb. 8, 1944 |
| 2,680,385 | Estin | June 8, 1954 |
| 2,709,105 | Kramer | May 24, 1955 |
| 2,862,761 | Scheidegger | Dec. 7, 1958 |

FOREIGN PATENTS

| | | |
|---|---|---|
| 600,536 | Canada | June 28, 1960 |
| 661,746 | France | Mar. 11, 1929 |